US012577383B2

(12) United States Patent
Wang et al.

(10) Patent No.: US 12,577,383 B2

(45) Date of Patent: Mar. 17, 2026

(54) HETEROPHASIC POLYPROPYLENE COMPOSITION

(71) Applicant: Borealis AG, Vienna (AT)

(72) Inventors: Jingbo Wang, Linz (AT); Markus Gahleitner, Linz (AT); Klaus Bernreitner, Linz (AT); Wilfried Toeltsch, Linz (AT); Simon Schwarzenberger, Linz (AT)

(73) Assignee: Borealis AG, Vienna (AT)

( * ) Notice: Subject to any disclaimer, the term of this patent is extended or adjusted under 35 U.S.C. 154(b) by 809 days.

(21) Appl. No.: 17/911,467

(22) PCT Filed: Mar. 17, 2021

(86) PCT No.: PCT/EP2021/056854

§ 371 (c)(1),
(2) Date: Sep. 14, 2022

(87) PCT Pub. No.: WO2021/185924

PCT Pub. Date: Sep. 23, 2021

(65) Prior Publication Data

US 2023/0094231 A1 Mar. 30, 2023

(30) Foreign Application Priority Data

Mar. 19, 2020 (EP) .................................... 20164256

(51) Int. Cl.

*C08L 23/12* (2006.01)
*C08K 5/524* (2006.01)
*C08K 5/5377* (2006.01)

(52) U.S. Cl.

CPC .............. *C08L 23/12* (2013.01); *C08K 5/524* (2013.01); *C08K 5/5377* (2013.01); *C08L 2207/02* (2013.01)

(58) Field of Classification Search

CPC ...... C08L 2207/02; C08L 23/10; C08L 23/12; C08L 23/16; C08L 2207/04; C08L 2207/20; C08L 2205/025; C08L 2205/03; C08F 210/06; C08F 2/001; C08F 210/16; C08F 2500/12; C08F 2500/15; C08F 2500/17

See application file for complete search history.

(56) References Cited

U.S. PATENT DOCUMENTS

| | | | | |
|---|---|---|---|---|
| 2012/0276312 | A1* | 11/2012 | Crown .................... | C08L 23/12 525/240 |
| 2015/0299442 | A1* | 10/2015 | Horill .................. | C08K 5/0083 524/451 |
| 2017/0137617 | A1* | 5/2017 | Wang ...................... | C08L 23/12 |
| 2022/0220231 | A1 | 7/2022 | Resconi et al. | |

FOREIGN PATENT DOCUMENTS

| | | | |
|---|---|---|---|
| EP | 2075284 | A1 | 7/2009 |
| WO | 2013007650 | A1 | 1/2013 |
| WO | 2019007655 | A1 | 1/2019 |
| WO | 2019134951 | A1 | 7/2019 |
| WO | 2019179959 | A1 | 9/2019 |
| WO | 2020011825 | A1 | 1/2020 |

OTHER PUBLICATIONS

Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.

Busico, et al., "Full Assignment of the 13C NMR Spectra of Regioregular Polypropylenes: Methyl and Methylene Region," Macromolecules, 1997, vol. 30, pp. 6251-6263, American Chemical Society.

Busico, et al., "Microstructure of polypropylene," Progress in Polymer Science, vol. 26, 2001, pp. 443-533.

Cheng, H.N., "C NMR Analysis of Ethylene-Propylene Rubbers," Macromolecules, 1984, vol. 17, 1984, pp. 1950-1955.

M. Aarnio-Winterhof et al., "Structure-property relatinos of Heterophasic Ethylene-Propylene Copolymers Based on a Single-Site Catalyst", Express Polymer Letters, vol. 11, No. 2, Jan. 1, 2017, pp. 152-161.

M. Varma-Nair et al.: "Quiescent crystallization kinetics of nucleated metallocene and ZN isotactic polypropylenes", (Journal of Thermal Analysis and Calorimetry, vol. 59, No. 1-2, Jan. 1, 2000, pp. 483-495.

Resconi, et al., "Selectivity in Propene Polymerization with Metallocene Catalysts," Chem. Rev., 2000, vol. 100, pp. 1253-134.

Wang, et al., "Structural Analysis of Ethylene/Propylene Copolymers Synthesized with a Constrained Geometry Catalyst," Macromolecules, 2000, vol. 33, pp. 1157-1162.

Zhou, et al., "A new decoupling method for accurate quantification of polyethylene copolymer composition and triad sequence distribution with 13C NMR," Journal of Magnetic Resonance, vol. 187, 2007, pp. 225-233.

Internal Search Report and Written Search Report PCT/EP2021/056854 mailed Mar. 2, 2022, 15 pages.

European Search Report for EP20164256.8 dated Aug. 16, 2020, 8 pages.

* cited by examiner

*Primary Examiner* — Mark S Kaucher

(74) *Attorney, Agent, or Firm* — Lowenstein Sandler LLP

(57) ABSTRACT

The present invention provides a heterophasic polypropylene composition with good response to nucleating agents, increased crystallisation temperature, good mechanical properties The present invention further relates to articles made thereof, and the use of the heterophasic polypropylene composition for specific applications and producing these.

14 Claims, No Drawings

HETEROPHASIC POLYPROPYLENE COMPOSITION

CROSS-REFERENCE TO RELATED APPLICATION(S)

The present application is a national stage entry under 35 U.S.C. § 371 of International Application No. PCT/EP2021/056854, filed on Mar. 17, 2021, which claims priority to European Patent Application No. 20164256.8, filed on Mar. 19, 2020. The contents of these applications are hereby incorporated by reference in their entirety.

FIELD OF THE INVENTION

The present invention provides a heterophasic polypropylene composition with good response to nucleating agents, increased crystallisation temperature, and good mechanical properties The present invention further relates to articles made thereof, and the use of the heterophasic polypropylene composition for specific applications and producing these.

BACKGROUND INFORMATION

Heterophasic polypropylene compositions are known in the art. They are composed of a continuous propylene homo- or copolymer phase acting as a matrix, in which an elastomeric phase, e.g. and ethylene propylene rubber (EPR) is dispersed.

Heterophasic polypropylene copolymers are widely used in injection moulding applications, especially for producing packaging articles, as they are well known and appreciated for their mechanical properties as well as their very convenient processing. Typical applications are e.g. thin wall packaging, houseware applications, containers for food and other packaging issues, etc.

Said heterophasic polypropylene copolymers are often further modified with various nucleating agents to increase the crystallization temperature, or improve mechanical properties like stiffness.

A high crystallization temperature is also desired to allow faster conversion and consequently a reduction of cycle time, e.g. in injection moulding.

Said increase of stiffness however can negatively influence the impact behaviour, making polymers more brittle.

There is accordingly in general a conflict of aims if one wants at the same time provide a heterophasic polypropylene composition with high stiffness and high impact behaviour at the same time.

Single site catalysts (SSC) are well known in the field of producing polypropylenes. They are increasingly used for copolymerisation of propylene with other comonomers, due to their highly random insertion of the comonomer units along the chain.

Propylene polymers produced with single site catalysts are known to provide better stiffness/impact balance than comparable polymers produced with Ziegler-Natta catalysts. However, due to the differences in the molecular structures, SSC-based polymers are widely reported to have weaker response to nucleation. This is mainly expressed in lower crystallization temperatures than observed in polymers produced via Ziegler-Natta catalysis while having similar polymer characteristics as e.g. comonomer content and type, amount of soluble fractions, etc.

DESCRIPTION OF THE PRIOR ART

M. Varma-Nair et al. report in "Quiescent crystallization kinetics of nucleated metallocene and ZN isotactic polypropylenes", (*Journal of Thermal Analysis and calorimetry,* 59 (2000) 483-495), that both α- and β-nucleation response is worse in polypropylene copolymers produced via single-site catalysis, although the respective homopolymers have almost the same crystallization behaviour as those based on heterogeneous Ti-halogenide (Ziegler-Natta) catalysts. The crystallisation temperatures of metallocene polypropylenes are reported to be at most 123° C., and only homopolymers of limited toughness are presented.

WO/2020/011825 discloses a heterophasic polypropylene composition, which comprises 60.0 to 95.0 wt.-% of a crystalline propylene homopolymer, 5.0 to 20.0 wt.-% of an elastomeric ethylene-propylene rubber, and at least one polymeric nucleating agent, wherein the crystalline propylene homopolymer (H-PP) and the elastomeric ethylene-propylene rubber (EPR) have been produced in the presence of a single-site catalyst. It discloses polymers having lower amounts of comonomer in the soluble fraction, which have good transparency but very limited toughness, especially at −20° C.

EP 2075284 A1 discloses a heterophasic propylene copolymer having a high flowability with a fraction insoluble in cold xylene (XCI) having intrinsic viscosity of below 1.5 dl/g, a fraction soluble in cold xylene (XCS) having an intrinsic viscosity of 1.5 to 3.0 dl/g and a comonomer content in the fraction soluble in cold xylene (XCS) of 25 to 50 mol %. Its example have an intrinsic viscosity of the in fraction insoluble in cold xylene, IV of XCI of 0.7-0.9 dl/g. It aims for improved impact behaviour at low temperatures combined with good flowability, but is however poor in toughness, especially at −20° C.

WO/2019/134951 discloses a heterophasic propylene copolymer comprising a) 65 to 90 wt. % of a matrix component (M) selected from a propylene homo- or random copolymer (PP); and b) 10 to 35 wt. % of an ethylene-propylene rubber (EPR), dispersed in the propylene homo- or random copolymer (PP), whereby the xylene cold soluble fraction (XCS) of the heterophasic propylene polymer (HECO) has an ethylene content of 12 to 20 wt. %; an intrinsic viscosity (IV), determined according to ISO 1628-1:2009, of at least 1.6 dl/g; and the xylene cold insoluble fraction (XCI) of the heterophasic propylene polymer (HECO) has 2,1-erythro regiodefects in an amount of at least 0.4 mol %. It discusses the addition of nucleating agents.

The examples disclosed have a comonomer content of the solube fraction, C2 (XCS) in between 14.1 and 14.8 wt.-%, having good transparency but very limited toughness, especially at −20° C.

OBJECT OF THE INVENTION

The present invention overcomes the drawbacks of the prior art. It discloses a heterophasic polypropylene composition with a specific combination of the amount of the soluble fraction in the heterophasic polypropylene composition, its comonomer content and the nucleating agent. This leads to a heterophasic polypropylene composition having good response to nucleating agents, increased crystallisation temperature and good mechanical properties.

In particular, it discloses a heterophasic propylene composition comprising 99.0-99.99 wt.-% of a heterophasic propylene copolymer and 0.01-1.0 wt.-% of a nucleating agent, wherein the heterophasic propylene copolymer is characterised by comprising i) 65.0 to 90.0 wt.-% of a crystalline matrix being a propylene homo- or copolymer, said crystalline matrix corresponding to the crystalline fraction (CF) determined according to CRYSTEX QC method, ISO 6427-B, having an intrinsic viscosity, IV(CF) in the range of 1.0-4.0 dl/g and containing 1.5 to 3.5 wt.-% comonomer and ii) 10.0 to 35.0 wt.-% of an amorphous propylene-ethylene elastomer, optionally comprising of C4-C12 alpha -olefin(s) as further comonomers, dispersed in said crystalline matrix (i), said amorphous propylene ethylene elastomer (ii) corresponds to the soluble fraction (SF) determined according to CRYSTEX QC method, ISO 6427-B, and has comonomer content of soluble fraction, (C2 of SF) in the range of 20.0-35.0 wt.-%, wherein i) and ii) add up to 100 wt.-%, characterised in that the heterophasic polypropylene composition has a crystallisation temperature (Tc) of at least 124° C.

The present invention also discloses articles, like injection moulded articles comprising said heterophasic polypropylene composition as well as the use of the heterophasic polypropylene composition for producing such articles.

The present polymers provide an optimized correlation between crystallisation temperature, Tc and melting Temperature Tm. The increase in the crystallisation temperature ensures a fast crystallisation onset, which is more favourable during processing than a small range of under cooling, i.e. a small $\Delta T_{mc}$.

DETAILED DESCRIPTION

The heterophasic polypropylene composition of the present invention comprises a) 99.0-99.99 wt.-% of a heterophasic propylene copolymer and b) 0.01-1.0 wt.-% of a nucleating agent.

Preferably, the heterophasic polypropylene composition comprises 99.2 to 99.95 wt.-%, preferably 99.5 to 99.9 wt.-% of heterophasic propylene copolymer and 0.05 to 0.8 wt.-%, preferably 0.1 to 0.5 wt.-% of a nucleating agent.

Preferably, the heterophasic polypropylene composition of the present invention consists of 99.0-99.99 wt.-% of a heterophasic propylene copolymer and 0.01-1.0 wt.-% of a nucleating agent.

The MFR230/2.16 of the heterophasic polypropylene composition may be in the range of 0.1 to 100 g/10 min, preferably in the range of 0.5 to 50 g/10 min, more preferably in the range of 1.0 to 20 g/10 min.

The crystallisation temperature ($T_a$) of the heterophasic polypropylene composition may be in the range of at least 124 to 135° C., preferably in the range of 125 to 132° C., more preferably in the range of 126 to 130° C.

The melting temperature of the heterophasic polypropylene composition ($T_m$) may be in the range of 150 to 165° C., preferably in the range of 155 to 164° C., more preferably in the range of 157 to 163° C.

The melting enthalpy of the heterophasic polypropylene composition may be in the range of 70 to 100 J/g, preferably in the range of 75 to 98 J/g, more preferably in the range of 78 to 96 J/g.

The heterophasic polypropylene composition may have a fraction soluble in cold xylene (XCS) in the range of 10.0 to 35.0 wt.-%, preferably in the range of 12.0 to 31.0 wt.-%, more preferably in the range of 14.0 to 28.0 wt.-%.

Referring also to the Crystex method description, it is herewith noted, that the values for XCS roughly, but not precisely, correspond to the soluble fraction (SF) as determined in Crystex.

The heterophasic propylene composition is formed to a major part by the heterophasic polypropylene copolymer.

Accordingly, properties relating to the polymer (like comonomer content or quality, amount and compositions of the crystalline or soluble fractions, viscosities of the crystalline and soluble fractions, etc.) are applicable to both the heterophasic polypropylene composition as well as the heterophasic propylene copolymer likewise.

Heterophasic Propylene Copolymer

The heterophasic propylene copolymer forms the major part of the heterophasic polypropylene composition and accordingly the first influences the properties of the latter.

The heterophasic propylene copolymer comprises 65.0 to 90.0 wt.-%, preferably 69.0 to 88.0 wt.-%, more preferably in the range of 72.0 to 86.0 wt.-% of a propylene homo- or copolymer, forming the crystalline matrix (i), which corresponds to the crystalline fraction CF determined by CRYSTEX QC method ISO6427-B.

Accordingly, the heterophasic polypropylene copolymer comprises an (ii) amorphous propylene ethylene elastomer dispersed in said crystalline matrix in the range of 10.0 to 35.0 wt.-%, preferably in the range of 12.0 to 31.0 wt.-%, more preferably in the range of 14.0 to 28.0 wt.-%. Said amorphous elastomer corresponds to the soluble fraction (SF) determined by CRYSTEX QC method ISO6427-B.

In a preferred embodiment, the heterophasic propylene copolymer consists of i) 65.0 to 90.0 wt.-%, preferably 69.0 to 88.0 wt.-%, more preferably in the range of 72.0 to 86.0 wt.-% of a propylene homo- or copolymer, forming the crystalline matrix (i), and ii) 10.0 to 35.0 wt.-%, preferably in the range of 12.0 to 31.0 wt.-%, more preferably in the range of 14.0 to 28.0 wt.-% of an amorphous propylene ethylene elastomer dispersed in said crystalline matrix, The heterophasic polypropylene copolymer contains comonomers, preferably alpha-olefins selected from ethylene an C4 to C8 alpha olefins, preferably from ethylene, 1-butene or 1-hexene.

In a preferred embodiment, the heterophasic polypropylene copolymer comprises ethylene and 1-butene as comonomer.

In an especially preferred embodiment, the heterophasic polypropylene copolymer comprises, only ethylene as the sole comonomer.

The comonomer content of the heterophasic propylene copolymer, C2 (total), may be in the range of may be in the range of 1.0 to 10.0 wt.-%, preferably in the range of 2.5 to 8.5 wt.-%, more preferably in the range of 4.0 to 7.5 wt.-%

The amount of the crystalline fraction (CF) of the heterophasic polypropylene copolymer is determined via determined by CRYSTEX QC method ISO6427-B and may be in the range of 65.0-90.0 wt.-%, preferably 69.0-88.0 wt.-%, more preferably in the range of 72.0 to 86.0 wt.-%.

The crystalline fraction may comprise comonomer as lined out above. The comonomer content of the crystalline fraction, C2(CF), may be in the range of 1.5 to 3.5 wt.-%, like 1.7 to 3.2 wt.-% or 1.7 to 2.8 wt.-%.

The soluble fraction (SF) of heterophasic propylene copolymer is also determined via determined by CRYSTEX QC method ISO6427-B and may be in the range of 10.0 to 35.0 wt.-%, preferably in the range of 12.0 to 31.0 wt.-%, more preferably in the range of 14.0 to 28.0 wt.-%.

The soluble fraction may comprise comonomer(s) as lined out above. The comonomer content of the soluble fraction, C2(SF), may be in the range of 20.0 to 35.0 wt.-%, preferably in the range of 21.0 to 33.0 wt.-%, more preferably in the range of 21.5 to 31.0 wt.-%. or 22.5 to 30.0 wt.-%

It is understood that the quality and quantity of the comonomers in the heterophasic polypropylene copolymer, the crystalline fraction as well as the soluble fraction may be selected and varied independently from each other.

The intrinsic viscosity of the soluble fraction of the heterophasic propylene copolymer, IV(SF), may be in the range of 2.0 to 5.0 dl/g, preferably in the range of 2.2 to 4.5 dl/g, more preferably in the range of 2.3 to 4.0 dl/g.

The intrinsic viscosity of the crystalline fraction of the heterophasic propylene copolymer, IV(CF), may be in the range of 1.0 to 4.0 dl/g, preferably in the range of 1.3 to 3.7 dl/g, more preferably in the range of 1.5 to 3.4 dl/g like 1.7 to 3.2 dl/g The ratio between the IV(SF) to the IV(CF may be in the range of at least 0.83 to 2.5, preferably in the range of 0.85 to 2.2, more preferably in the range of 0.85 to 2.0.

The crystalline fraction (CF) of the heterophasic propylene polymer (HECO) may have 2,1-erythro region defects in an amount of at least 0.3 wt.-%. Usually the amount of 2,1-erythro region defects in the xylene cold insoluble fraction (XCI) of the heterophasic propylene polymer (HECO) may be not higher than 2.0 wt.-%. It may be preferably in the range of 0.5 to 1.5 wt.-% or 0.6 to 1.2 wt.-%.

As well-known in the art, the amount of 2,1-erythro regiodefects in propylene homo- or random copolymers produced with a Ziegler Natta catalyst is 0.0 wt.-%. Thus, the heterophasic propylene polymer (HECO) is usually produced using a single-site catalyst such as a metallocene catalyst. Suitable catalysts are provided below.

All the properties described for the heterophasic propylene copolymer above are accordingly also applicable for the heterophasic polypropylene composition of the present invention.

The heterophasic propylene copolymer does not contain any nucleating agents. Thus, the mechanical and/or crystallisation behaviour of the neat polymer will be different to the according properties of the (final) heterophasic polypropylene composition of the present invention:

The crystallisation temperature ($T_a$) of the neat heterophasic propylene copolymer may be in the range of 110 to 125° C., preferably in the range of 111 to 122° C., more preferably in the range of 113 to 120° C.

The melting temperature ($T_c$) neat heterophasic propylene copolymer may be in the range of 150 to 165° C., preferably in the range of 153 to 163° C., more preferably in the range of 155 to 162° C.

The flexural modulus of the neat heterophasic propylene copolymer may be in the range of 500 to 2000 MPa, preferably in the range of 600 to 1600 MPa, more preferably in the range of 650 to 1300 MPa.

Melting enthalpy of the neat heterophasic propylene copolymer may be in the range of 60 to 95 J/g, preferably in the range of 65 to 93 J/g, more preferably in the range of 68 to 90 J/g.

Charpy NIS/23° C. of the neat heterophasic propylene copolymer may be in the range of 5.0 to 100.0 kJ/m$^2$, preferably in the range of 15.0 to 90.0 kJ/m$^2$, more preferably in the range of 20.0 to 80.0 kJ/m$^2$.

Charpy NIS/−20° C. of the neat heterophasic propylene copolymer may be in the range of 1.0 to 20 kJ/m$^2$, preferably in the range of 2.0 to 15 kJ/m$^2$, more preferably in the range of 2.5 to 12.0 kJ/m$^2$.

Nucleating Agent:

The heterophasic polypropylene composition of the present invention comprises 0.01-1.0 wt.-% (based on the total weight of the heterophasic polypropylene composition) of a nucleating agent.

The nucleating agent is selected from the following groups of nucleating agents consisting of:

(i) monocarboxylic acids and polycarboxylic acids, (ii) salts of diesters of phosphoric acid, and (iii) polymeric nucleating agents.

(iv) sorbitol derivatives and (v) trisamide derivatives.

Accordingly, the nucleating agent may be selected from the groups comprising (i) salts of monocarboxylic acids and polycarboxylic acids, e.g. sodium benzoate or aluminum tert-butylbenzoate; or 1,2-cyclohexane dicarboxylicacid Ca-salt, of which the 1,2-cyclohexane dicarboxylicacid Ca-salt is especially preferred;

(ii) salts of diesters of phosphoric acid, e.g. sodium 2,2'-methylenebis (4,6,-di-tertbutylphenyl) phosphate or aluminium-hydroxy-bis[2,2'-methylene-bis(4,6-di-tbutylphenyl)phosphate], and hydroxybis (2,4,8,10-tetra-tert-butyl-6-hydroxyl2Hdibenzo(d,g)(1,3,2) dioxaphosphocin 6-oxidato) aluminium, wherein hydroxybis (2,4,8,10-tetra-tert-butyl-6-hydroxy-12H-dibenzo(d,g)(1,3,2) dioxaphosphocin 6-oxidato) aluminium or sodium 2,2'-methylenebis (4,6,-di-tert-butylphenyl) phosphate are preferred;

(iii) crystalline polymers, like poly(vinyl cyclohexane) (PVCH), poly(4-methyl pentene-1) (P4MP) and poly (tetrafluoro ethylene), where PVCH is preferred;

(iv) sorbitol derivatives, e.g. di(alkylbenzylidene)sorbitols as 1,3:2,4-dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, e.g. 1,2,3-trideoxy-4,6;5,7-bis-O-[(4-propylphenyl)methylene]nonitol; and (v) benzene-trisamides like substituted 1,3,5-benzenetrisamides as N,N',N"-tris-tert-butyl1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide. It is especially preferred, that the at least one α-nucleating agent (c) in the heterophasic polypropylene composition of the present invention is selected from 1,3:2,4-dibenzylidene sorbitol, 1,3:2,4-Bis(3,4-dimethylbenzylidene) sorbitol, 1,2,3-trideoxy4,6;5,7-bis-O-[(4-propylphenyl)methylene]nonitol and N-[3,5-bis-(2,2-dimethyl propionylamino)-phenyl]-2,2-dimethyl-propionamide.

In a preferred embodiment, the heterophasic polypropylene composition does not comprise polymeric nucleating agents.

The following nucleating agents are known as polymeric nucleating agents and accordingly not envisaged in the preferred embodiment of the invention:

crystalline polymers, like poly(vinyl cyclohexane) (PVCH), poly(4-methyl pentene-1) (P4MP) and poly (tetrafluoro ethylene), where PVCH is preferred;

In a particular embodiment, particular, i.e. non-soluble nucleating agents as listed in groups (i) or (ii) are preferred.

Especially preferred are non-soluble and non-polymeric nucleating agents as listed in groups (i), or (ii), especially preferred are hydroxybis (2,4,8,10-tetra-tert-butyl-6-hydroxy-12H-dibenzo(d,g)(1,3,2) dioxaphosphocin 6-oxidato) aluminium or sodium 2,2'-methylenebis (4,6,-di-tert-butylphenyl) phosphate.

Additives:

The heterophasic polypropylene composition according to the invention may further comprise conventional additives in an amount of up to 5.0 wt.-%, preferably in an amount of 0.1 to 2.0 wt.-%, more preferably in an amount of 0.3 to 1.0 wt.-%. Examples of additives include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers, like antistatic or antifogging agents (for example ethoxylated amines and amides or glycerol esters), acid scavengers (for example Ca-stearate) and blowing agents for foaming. Further modifiers are lubricants and resins (for example ionomer waxes, polyethylene- and ethylene copolymer waxes, Fischer Tropsch waxes, montan-based waxes, fluoro-based compounds, or paraffin waxes), as well as slip and antiblocking agents (for example erucamide, oleamide, talc, natural silica and synthetic silica or zeolites) and mixtures thereof.

It is further understood, that polymers introduced as carriers of masterbatches or the like, may be present in the heterophasic polypropylene composition in the range of 0.1 to 5.0 wt.-%, even in case the claim is formulated in the closed wording, ("heterophasic polypropylene composition consisting of . . . ").

Mechanical Characterisation:

The heterophasic polypropylene composition of the present invention may be characterised by its physical, i.e. mechanical properties:

The flexural modulus according to ISO178 may be in the range of 600 to 2500 MPa, preferably in the range of 700 to 2000 MPa, more preferably in the range of 850 to 1700 MPa.

The notched impact strength, ISO179, determined at +23° C., Charpy NIS/23° C., may be in the range of 5.0 to 100.0 $kJ/m^2$, preferably in the range of 15.0 to 90.0 $kJ/m^2$, more preferably in the range of 20.0 to 80.0 $kJ/m^2$.

In a particular embodiment, the Charpy NIS/23° C., may be in the range of 35- 90 $kJ/m^2$, like 60-85 $kJ/m^2$.

The notched impact strength, ISO179, determined at −20° C., Charpy NIS/-20° C., may be in the range of 1.0 to 20 $kJ/m^2$, preferably in the range of 2.0 to 15 $kJ/m^2$, more preferably in the range of 2.5 to 12.0 $kJ/m^2$.

Ideally, the heterophasic polypropylene composition may have a flexural modulus according to ISO178 in the range of 600 to 2500 MPa, preferably in the range of 700 to 2000 MPa, or 850 to 1700 MPa and optionally either or both of:

a Charpy notched impact strength, ISO179, determined at +23° C. in the range of 5.0 to 100.0 kJ/m, preferably in the range of 15.0 to 90.0 $kJ/m^2$, or 20.0 to 80.0 $kJ/m^2$ and/or a Charpy notched impact strength, ISO179, determined at −20° C., in the range of 1.0 to 20 $kJ/m^2$, preferably in the range of 2.0 to 15 $kJ/m^2$, or 2.5 to 12.0 $kJ/m^2$.

Polymerisation Process

The heterophasic propylene copolymer encompassed by the heterophasic polypropylene composition of the present invention is preferably produced by sequential polymerisation, wherein in one step the crystalline matrix being a propylene homo- or copolymer, is produced and in a subsequent step the amorphous propylene-ethylene elastomer is produced in the presence of above mentioned propylene homo- or copolymer.

Accordingly, the amorphous propylene ethylene elastomer is not present as a separate fraction.

The process for polymerising the heterophasic propylene copolymer encompassed by the heterophasic polypropylene composition comprises polymerising propylene in at least two, preferably two polymerisation steps in the presence of a single-site catalyst, wherein a) in a first polymerisation reactor propylene and optionally comonomers is polymerised to obtain a crystalline matrix being a propylene homo- or copolymer, said matrix is the transferred to a second polymerisation reactor, preferably being a gas phase reactor (GPR),
b) in the second polymerisation reactor, the amorphous propylene-ethylene elastomer is produced in the presence of above mentioned propylene homo- or copolymer.

Consecutively, a nucleating agent may be introduced into the heterophasic propylene copolymer either by a compounding step or as a Master Batch, to form the heterophasic polypropylene composition of the present invention.

The process may be preceded by one or more prepolymerisation steps.

Catalyst

Catalyst System:

The heterophasic polypropylene composition according to the invention is preferably obtainable by a catalyst system comprising by a single-site catalyst, more preferably being obtainable by a metallocene catalyst complex and cocatalysts.

Particularly preferred catalyst are:

rac-anti-di methylsilanediyl [2-methyl-4,7-bis-(3',5'-dimethyl phenyl)-1,5,6,7-tetrahydro-s-indacen-1-yl][2-methyl-4-(3',5'-ditert.-butyl-phenyl)-5-methoxy-6-tert-butylinden-1-yl]zirconium dichloride or rac-anti-di methylsilanediyl [2-methyl-4-(3',5'-dimethyl phenyl)-1,5,6,7-tetrahydro-s-indacen-1-yl][2-methyl-4-(3',5'-dimethylphenyl)-5-methoxy-6-tert-butyl inden-1-yl]zirconium dichloride dichloride).

Cocatalyst

To form an active catalytic species it is normally necessary to employ a cocatalyst as is well known in the art.

According to the present invention a cocatalyst system comprising a boron containing cocatalyst and an aluminoxane cocatalyst is used in combination with the above defined metallocene catalyst complex.

The aluminoxane cocatalyst can be one of formula (I):

(I)

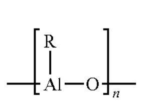

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (II).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

Also, a boron containing cocatalyst is used in combination with the aluminoxane cocatalyst. The catalyst complex ideally comprises a co-catalyst, certain boron containing cocatalysts are preferred. Especially preferred borates of use in the invention therefore comprise the trityl, i.e. triphenylcarbenium, ion. Thus the use of $Ph_3CB(PhF_5)_4$ and analogues therefore are especially favoured.

The catalyst system of the invention is used in supported form. The particulate support material used is silica or a mixed oxide such as silica-alumina, in particular silica.

The use of a silica support is preferred. The skilled man is aware of the procedures required to support a metallocene catalyst.

In a preferred embodiment, the catalyst system corresponds to the ICS3 of EP19177308.4.

Articles

The present invention also covers final articles, especially moulded articles comprising the heterophasic polypropylene composition of the present invention.

The articles may be injection moulded and may be used for packaging purposes or for application in the automotive industry.

Preferably, said articles have a wall thickness of 0.1 to 3.0 mm, such as 0.5 to 2.5 mm, like 1.0 to 2.0 mm.

The present invention will now be described in further detail by the examples provided below:

EXAMPLES

Measuring Methods

Melt Flow Rate

The melt flow rate ($MFR_2$) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_a$) and heat of crystallization ($H_c$) are determined from the cooling step, while melting temperature ($T_m$) and melt enthalpy (Hm) are determined from the second heating step.

Xylene Cold Soluble (XCS)

Xylene Cold Soluble fraction at room temperature (XCS, wt.-%) is determined at 25° C. according to ISO 16152; $5^{th}$ edition; 2005 Jul. 1.

Flexural Modulus

The flexural modulus was determined in 3-point-bending at 23° C. according to ISO 178 on 80×10×4 $mm^3$ test bars injection moulded in line with EN ISO 1873-2.

The ΔFlexural modulus defines the difference of the Flexural Modulus between a nucleated and a non-nucleated polymer.

Notched Impact Strength (NIS)

The Charpy notched impact strength (NIS) was measured according to ISO 179 1eA at +23° C. or −20° C., using injection moulded bar test specimens of 80×10×4 $mm^3$ prepared in accordance with EN ISO 1873-2.

Crystex Analysis

Crystalline and Soluble Fractions Method

The crystalline (CF) and soluble fractions (SF) of the polypropylene (PP) compositions as well as the comonomer content and intrinsic viscosities of the respective fractions as well as the comonomer content of the final polymers were analyzed by the CRYSTEX QC, Polymer Char (Valencia, Spain).

The crystalline and amorphous fractions are separated through temperature cycles of dissolution at 160° C., crystallization at 40° C. and re-dissolution in a 1,2,4-trichlorobenzene (1,2,4-TCB) at 160° C. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt.-% to 69 wt.-% (determined by 13C-NMR) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 Wt.-%.

The intrinsic viscosity (IV) of the parent EP copolymer and its soluble and crystalline fractions are determined with a use of an online 2-capillary viscometer and are correlated to corresponding IV's determined by standard method in decalin according to ISO 1628. Calibration is achieved with various EP PP copolymers with IV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

As shown in a FIGS. 1*a* and *b*, a defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt.-%] of the PP composition. During the second injection the soluble fraction (at low temperature) and the crystalline fraction (at high temperature) with the crystallization cycle are measured (wt.-% SF, wt.-% C2, IV).

EP means ethylene propylene copolymer.

PP means polypropylene.

Quantification of Microstructure by NMR Spectroscopy

Quantitative nuclear-magnetic resonance (NMR) spectroscopy was used to quantify the isotacticity and regioregularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically, the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

$$[mmmm]\%=100*(mmmm/\text{sum of all pentads})$$

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio-defects:

$$P_{total}=P_{12}+P_{21e}$$

The mole percent of 2,1 erythro regio-defects was quantified with respect to all propene:

$$[21e]\ mol.\text{-}\%=100*(P_{21e}/P_{total})$$

Material Description:

Catalyst Description:

MC1

Catalyst used in PP-CE1 was MC1, (rac-anti-dimethylsilandiyl(2-methyl-4-phenyl-5-methoxy-6-tertbutyl-indenyl) (2-methyl-4-(4-tert-butylphenyl)indenyl)zirconium dichloride) has been synthesized as described in WO 2013/007650, E2.

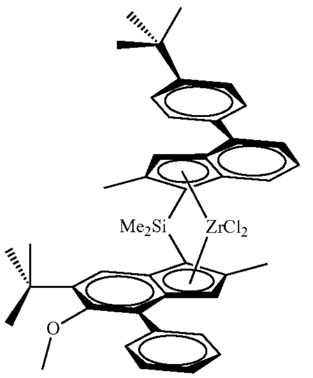

Figure 1: Metallocene MC1 for PP-CE1

The catalyst system was prepared using metallocene MC1 and a cocatalyst system of MAO.

The catalyst was supported onto silica

MC2

The catalyst used for PP1 and PP2 was MC2, rac-anti-dimethylsilanediyl [2-methyl-4,8-bis-(3',5'-dimethyl phenyl)-1,5,6,7-tetrahydro-s-indacen-1-yl][2-methyl-4-(3',5'-ditert.-butyl-phenyl)-5-methoxy-6-tert-butylinden-1-yl] zirconium dichloride.

The catalyst was prepared as disclosed in WO2019/179959, for MC3, on page 40 and page 55.

The catalyst system was prepared using metallocene MC2 and a cocatalyst system of MAO and boron The catalyst was supported onto silica.

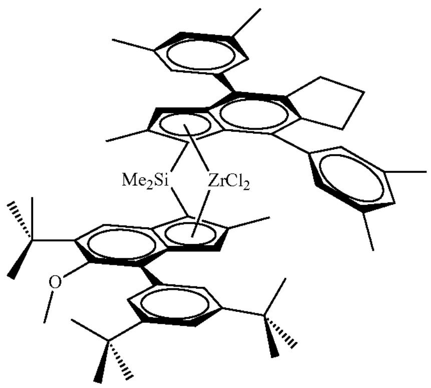

Figure 2: Metallocene MC2 for PP1 and PP2

Preparation of MAO-Silica Support.

A glass reactor equipped with a mechanical stirrer anchor-type stirrer was charged with silica (10.0 g), grade DM-L-

303 from AGC Si-Tech Co, pre-calcined at 600° C. Then toluene (50 mL) was added. The mixture was stirred under N2, as MAO solution (25 mL, 30 wt % in toluene) from Lanxess was added via cannula while maintaining the temperature around 35° C. Upon completion of the addition, the solids were allowed to settle and the supernatant was removed and discarded. Fresh toluene (50 mL) was added and the mixture was then heated up to 80° C. and stirred at 80° C. for additional hour. The slurry was allowed to settle and the mother liquor was filtered off. The catalyst was washed twice with toluene (50 mL) at 80° C., following by settling and filtration. The reactor was cooled down to 60° C. and the solid was washed with heptane (50 mL). Finally MAO treated $SiO_2$ was dried at 60° C. for 2 h under vacuum. MAO treated support was collected as a free-flowing white powder (13 g).

Catalyst Preparation

In a nitrogen filled glovebox, a solution of MAO 0.25 mL (30% wt in toluene, AXION 1330 CA Lanxess) in dry toluene (1 mL) was added to an aliquot of metallocene MC-D85 (39.0 mg, 39 μmol). The mixture was stirred for 30 minutes at room temperature. Next, trityl tetrakis(perfluorophenyl)borate (Boulder) (36.0 mg, 39 μmol) was added and the solution was allowed to stir for an additional 30 minutes at room temperature. Next, 1.0 g of MAO treated silica prepared as described above, was placed in a glass vial. A solution of metallocene, MAO and trityl borate in toluene was then slowly added to the support over the course of 5 minutes with gentle mixing. The resulting mixture was shaken well and allowed to stay overnight. Then dry toluene (5 mL) was added, and the slurry was mixed well with the inert gas sparging over 10 minutes. The solid was allowed to settle, and liquid was filtered off and discarded. The resulting cake was dried in vacuum for 1 hour to yield 1.0 g of the catalyst as pink free flowing powder.

MC3

The catalyst used for PP3 was MC3, rac-anti-dimethylsilanediyl [2-methyl-4-(3',5'-dimethyl phenyl)-1,5,6,7-tetrahydro-s-indacen-1-yl][2-methyl-4-(3',5'-dimethylphenyl)-5-methoxy-6-tert-butyl inden-1-yl]zirconium dichloride dichloride) was synthesized according to the procedure as described in WO2019/007655, pp 49ff.

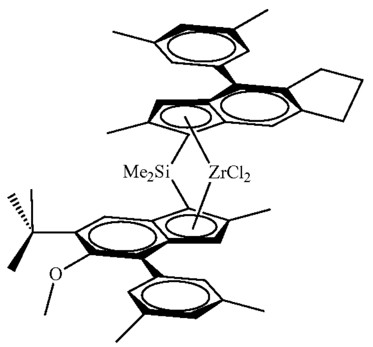

Figure 3: Metallocene MC3 for PP3

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurising with nitrogen using manual valves. Then toluene (22 kg) was added. The mixture was stirred for 15 min. Next 30 wt % solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.2% Al by weight.

Catalyst Preparation 30 wt % MAO in toluene (0.7 kg) was added into a steel nitrogen blanked reactor via a burette at 20° C. Toluene (5.4 kg) was then added under stirring. The MC3 as cited above (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a a stirred cake of MAO-silica support prepared as described above over 1 hour. The cake was allowed to stay for 12 hours, foiled by drying under N2 flow at 60° C. for 2 h and additionally for 5 h under vacuum (−0.5 barg) under stirring. Dried catalyst was sampled in the form of pink free flowing powder containing 13.9% Al and 0.11% Zr.

The polymerisation was done in a 25 L bench scale reactor. The details of the polymerisation are shown in Table 1.

TABLE 1

Polymerisation Data

| Catalyst | | PP-CE1 MC1 | PP1 MC2 | PP2 MC2 | PP3 MC3 |
|---|---|---|---|---|---|
| Prepolymerisation | | | | | |
| Residence time | min | 10 | 10 | 10 | 10 |
| H2 | nl | 0 | 0 | 0 | 0 |
| Bulk step = Loop | | | | | |
| Temperature | ° C. | 75 | 75 | 75 | 75 |
| Total H2 | nl | 2 | 2 | 2 | 2 |
| Residence time | min | 30 | 30 | 30 | 30 |
| Split | wt % | 43 | 82 | 80 | 78 |
| First Gas phase polymerisation | | | | | |
| Temperature | ° C. | 80 | 70 | 70 | 70 |
| Total H2 | nl | 2.0 | 0 | 0.1 | 0 |
| Residence time | min | 90 | 90 | 90 | 90 |
| C2/C3 | wt %/wt % | 0.05 | 0.83 | 0.82 | 0.69 |
| Pressure | barg | 21 | 25 | 25 | 16 |
| Split | wt % | 41 | 18 | 20 | 22 |
| Second Gas phase polymerisation | | | | | |
| Temperature | ° C. | 75 | not used | not used | not used |
| Total H2 | nl | 0 | | | |
| Residence time | min | 90 | | | |
| C2/C3 | wt%/wt% | 0.67 | | | |
| Pressure | barg | 16 | | | |
| Split | wt% | 16 | | | |

All of the base polymer were made in a bench scale reactor.

The polymer powder were stabilized with 1500 ppm of Irganox B225 (supplied by BASF) and 500 ppm of synthetic hydrotalcit (MAHC).

Nucleated polymers contained 2000 ppm of NA 21, commercially available from Adeka.

CE2 was disclosed in WO2020/011825 as CE1.

PP-CE3 corresponds to Sample ID "M-iPP (cycled)" as disclosed in by M. Varma-Nair et al.:"Quiescent crystallization kinetics of nucleated metallocene and ZN isotactic polypropylenes", (*Journal of Thermal Analysis and calorimetry,* 59 (2000) 483-495) in table 1 on p 486.

CE3 corresponds to Sample ID "M-iPP+0.2% α-nucl." as disclosed in by M. Varma-Nair et al.:"Quiescent crystallization kinetics of nucleated metallocene and ZN isotactic polypropylenes", (*Journal of Thermal Analysis and calorimetry,* 59 (2000) 483-495) in table 1 on p 486.

TABLE 2

Polymer properties of the heterophasic propylene copolymers used in the Inventive and Comparative examples

| Polymer: | | CE1 PP-CE1 | CE2 | CE3 PP-CE3 | IE1 PP1 | IE2 PP2 | IE3 PP3 |
|---|---|---|---|---|---|---|---|
| MFR230/2.16 | g/10 min | 4.0 | 2.5 | 2.8 | 5.0 | 6.0 | 1.0 |
| Crystex: | | | | | | | |
| Soluble fraction (SF) | wt.-% | 18 | 12 | <1.0 | 17 | 19 | 23 |
| C2 (total) | wt.-% | 5.9 | 2.3 | 0 | 6 | | 6.8 |
| C2(SF) | wt.-% | 19 | 17.1 | 0 | 27 | 28.2 | 23.9 |
| C2(CF) | wt.-% | 3.4 | 1.3 | 0 | 2.6 | 2.5 | 1.8 |
| IV(SF) | dl/g | 1.8 | 1.9 | n.d. | 3.6 | 3.6 | 2.5 |
| IV(CF) | dl/g | 2.2 | 2.3 | n.d. | 2.0 | 1.9 | 2.9 |
| Ratio IV(SF)/IV(CF) | — | 0.82 | 0.83 | — | 1.80 | 1.89 | 0.86 |
| NMR: | | | | | | | |
| <mmmm> matrix | % | n.d. | 99.4 | n.d. | 99.7 | 99.7 | 99.4 |
| <2, 1> regio-defects | mol % | n.d. | 0.7 | n.d. | 0.9 | 0.9 | 0.7 |

TABLE 3

Mechanical properties of the heterophasic propylene copolymer (not nucleated)

| Used in example: | | PP-CE1 CE1 | PP-CE3 CE3 | PP1 IE1 | PP2 IE2 | PP3 IE3 |
|---|---|---|---|---|---|---|
| Flexural modulus | MPa | 493 | | 1056 | 998 | 786 |
| Tc | ° C. | 108 | 114.8 | 118 | 118 | 115 |
| Tm1 | ° C. | 145 | 154.8 | 160 | 160 | 157 |
| Hm1 | J/g | 63 | | 86 | 84 | 77 |
| NIS/23°C | kJ/$m^2$ | 61 | | 25.1 | 45.2 | 77.2 |
| NIS/-20 °C | kJ/$m^2$ | 1.3 | | 5.7 | 6.4 | 2.9 |

TABLE 4

Mechanical properties of the heterophasic propylene compositions of the comparative and inventive examples

| | | CE1 | CE2 | CE3 | IE1 | IE2 | IE3 |
|---|---|---|---|---|---|---|---|
| Nucleation agent: | | 2000 ppm NA21 | 15 ppm pVCH | 2000 ppm DMDBS | 2000 ppm NA21 | 2000 ppm NA21 | 2000 ppm NA21 |
| Flexural modulus | MPa | 580 | 1421 | | 1355 | 1264 | 998 |
| Tc | ° C. | 119 | 126 | 123.0 | 128 | 128 | 126 |
| Tm1 | ° C. | 149 | 162 | 154.4 | 162 | 162 | 159 |
| Hm1 | J/g | 65 | | | 94 | 89 | 80 |
| NIS/23° C. | kJ/$m^2$ | 60.0 | | | 26.5 | 49.0 | 74.6 |
| NIS/−20° C. | kJ/$m^2$ | 1.2 | | | 5.7 | 6.6 | 3.2 |
| ΔFlexural modulus | MPa | 87 | | | 299 | 266 | 212 |
| Tm-Tc | ° C. | 30 | 36 | 31.4 | 34 | 34 | 33 |
| ΔTc | ° C. | 11 | | 8.2 | 10 | 10 | 11 |

Table 4 clearly shows, that the inventive examples IE1, IE2 and IE3 have a specific combination of the polymer features and fulfil the requirements in view of crystallisation temperature. The object of the invention is fulfilled.

The invention claimed is:

1. A heterophasic polypropylene composition comprising:

a) 99.0-99.99 wt.-% of a heterophasic polypropylene copolymer and b) 0.01-1.0 wt.-% of a non-soluble nucleating agent, wherein the heterophasic propylene copolymer is characterized by comprising:

i) 69.0 to 88.0 wt.-% of a crystalline matrix being a propylene homo- or copolymer, the crystalline matrix corresponding to the crystalline fraction (CF) determined according to ISO 6427-B in 1,2,4-trichlorobenzene at 160° C., having an intrinsic viscosity, IV (CF) in the range of 1.3 to 3.7 dl/g and containing 1.5 to 3.5 wt.-% comonomer and ii) 12.0 to 31.0 wt.-% of an amorphous propylene-ethylene elastomer, optionally comprising of C4-C12 alpha-olefin(s) as further comonomers, dispersed in the crystalline matrix (i), the amorphous propylene ethylene elastomer (ii) corresponds to the soluble fraction (SF) determined according to ISO 6427-B in 1,2,4-trichlorobenzene at 160° C., and has comonomer content of soluble fraction, (C2 of SF) in the range of 21.5 to 33.0 wt.-%, wherein i) and ii) add up to 100 wt.-%, characterized in that the heterophasic polypropylene composition has a crystallisation temperature (Tc) of at least 124° C., 2,1-erythro regio defects in an amount of 0.3 to 2.0 wt.-%, and an Intrinsic Viscosity of the soluble fraction, IV(SF), in the range of 2.2 to 4.5 dl/g.

2. The heterophasic polypropylene composition according to claim 1, comprising:

i) 72.0 to 86.0 wt.-% of a crystalline matrix being a propylene homo- or copolymer, the crystalline matrix corresponding to the crystalline fraction (CF) determined according to ISO 6427-B in 1,2,4-trichlorobenzene at 160° C. and containing 1.5 to 3.5 wt.-% comonomer and ii) 14.0 to 28.0 wt.-% of an amorphous propylene-ethylene elastomer, optionally comprising of C4-C12 alpha-olefin(s) as further comonomers, dispersed in the crystalline matrix (i), the amorphous propylene ethylene elastomer (ii) corresponds to the soluble fraction (SF) determined according to ISO 6427-B in 1,2,4-trichlorobenzene at 160° C.

3. The heterophasic polypropylene composition according to claim 1 having a melting temperature Tm of at least 155° C.

4. The heterophasic polypropylene composition according to claim 1, wherein the heterophasic polypropylene composition does not contain any polymeric nucleating agent.

5. The heterophasic polypropylene composition according to claim 1 having an MFR230/2.16 according to ISO1133 of in the range 0.1 to 100 g/10 min.

6. The heterophasic polypropylene composition according to claim 1, wherein the heterophasic propylene copolymer has a total comonomer content in the range of 1.0 to 10.0 wt.-%.

7. The heterophasic polypropylene composition according to claim 1, wherein the heterophasic propylene copolymer has a comonomer content of soluble fraction, (C2 of SF) in the range 22.5 to 31.0 wt.-%.

8. The heterophasic polypropylene composition according to claim 1, wherein the heterophasic propylene copolymer has an Intrinsic Viscosity of the soluble fraction, IV(SF) in the range of 2.3 to 4.0 dl/g and/or an Intrinsic Viscosity of the crystalline fraction IV(CF), in the range of 1.5 to 3.4 dl/g.

9. The heterophasic polypropylene composition according to claim 1, having a ratio of the IV(SF) to the IV(CF) in the range of 0.83 to 2.5.

10. The heterophasic polypropylene composition according to claim 1, having 2,1-erythro region defects in an amount of at least 0.5 to 1.5 wt.-%.

11. The heterophasic polypropylene composition according to claim 1, having a crystallization temperature of in the range of 124 to 135° C.

12. The heterophasic polypropylene composition according to claim 1, having:

a flexural modulus according to ISO178 in the range of 600 to 2500 MPa and optionally either or both of:

a Charpy notched impact strength, ISO179, determined at +23° C. in the range of 5.0 to 100.0 $KJ/m^2$ and/or a Charpy notched impact strength, ISO179, determined at −20° C., in the range of 1.0 to 20 $KJ/m^2$.

13. A moulded article comprising the heterophasic polypropylene composition according claim 1.

14. The heterophasic polypropylene composition according to claim 1, wherein the non-soluble nucleating agent is selected from hydroxybis (2,4,8,10-tetra-tert-butyl-6-hydroxy-12H-dibenzo(d,g)(1,3,2) dioxaphosphocin 6-oxidato) aluminium or sodium 2,2'-methylenebis (4,6,-di-tert-butylphenyl) phosphate.

* * * * *